United States Patent [19]

Meina

[11] Patent Number: 5,330,953
[45] Date of Patent: Jul. 19, 1994

[54] PREPARATION OF ANATASE TITANIUM DIOXIDE

[75] Inventor: Dominic G. Meina, Strathclyde, Scotland

[73] Assignee: Tioxide Specialties Limited, London, England

[21] Appl. No.: 51,779

[22] Filed: Apr. 26, 1993

[30] Foreign Application Priority Data

Jun. 20, 1992 [GB] United Kingdom ............. 9213140.8

[51] Int. Cl.⁵ .......................... B01J 27/18; B01J 27/82
[52] U.S. Cl. .................................... 502/208; 106/430; 106/436; 106/438; 106/443; 502/214
[58] Field of Search .............. 106/430, 438, 443, 436; 502/208, 214

[56] References Cited

U.S. PATENT DOCUMENTS

| | | | |
|---|---|---|---|
| 3,127,280 | 3/1964 | Whately | 106/436 |
| 3,141,788 | 7/1964 | Whately | 106/438 |
| 3,505,088 | 4/1970 | Luginsland et al. | 106/436 |
| 3,513,007 | 5/1970 | Lederer . | |
| 3,522,078 | 7/1970 | May et al. | 106/436 |
| 3,545,994 | 12/1970 | Lott et al. | 106/436 |
| 3,859,109 | 1/1975 | Wiseman et al. . | |
| 3,926,660 | 12/1975 | Holle et al. . | |
| 4,052,223 | 10/1977 | Howard | 106/438 |
| 4,179,306 | 12/1979 | Woditsch et al. | 106/436 |
| 4,405,376 | 9/1983 | Matsunaga et al. | 106/438 |
| 4,814,318 | 3/1989 | Hums . | |
| 5,165,995 | 11/1992 | Losol | 106/443 |
| 5,242,880 | 9/1993 | Irick | 502/208 |

FOREIGN PATENT DOCUMENTS

| | | |
|---|---|---|
| 222487 | 5/1987 | European Pat. Off. . |
| 311515 | 4/1989 | European Pat. Off. . |
| 1023590 | 3/1966 | United Kingdom . |
| 1168136 | 10/1969 | United Kingdom . |
| 1176912 | 1/1970 | United Kingdom . |
| 1256341 | 12/1971 | United Kingdom . |
| 2039457 | 8/1980 | United Kingdom . |
| 2067088 | 7/1981 | United Kingdom . |
| 2242679 | 10/1991 | United Kingdom . |

*Primary Examiner*—Wayne Langel
*Attorney, Agent, or Firm*—Baker & Botts

[57] ABSTRACT a process for the preparation of anatase titanium dioxide having a high surface area and suitable as a catalyst support is described.

The process involves forming an aqueous dispersion of titanium dioxide at a pH less than 3 and preferably less than 1 and depositing a first coating of a hydrous oxide of an element which acts as a rutilisation inhibitor and a second coating of a phosphate on the particles of titanium dioxide.

The product of the process has a high surface area which is retained on heating for long periods at high temperature.

A novel product is particulate anatase titanium dioxide which has been coated with a rutile inhibitor and a phosphate, has a specific surface area of at least 50 m²/g and retains at least 80% of its surface area after heating at 800° C. for 7 days.

24 Claims, No Drawings

PREPARATION OF ANATASE TITANIUM DIOXIDE

This invention relates to anatase titanium dioxide and in particular to a method of preparing an anatase titanium dioxide having a high surface area.

Titanium dioxide is well known as a catalyst support in a variety of applications such as the total oxidation of volatile organic compounds, oxidation reactions including the production of phthalic anhydride from xylene and the removal of nitrogen oxides from exhaust gases.

Generally, the anatase crystal form of titanium dioxide is preferred since this promotes greater catalytic activity. For efficient catalytic activity it is important that the titanium dioxide has a high surface area.

Many catalytic processes are carried out at high temperatures where normally anatase titanium dioxide converts to the rutile crystal phase and also shows a marked decrease in surface area. It is therefore desirable to produce an anatase form of titanium dioxide having a high surface area which retains the anatase crystal form and high surface area at temperatures of about 800° C.

It is an object of this invention to provide a process for producing such a form of titanium dioxide.

According to the invention a process for preparing anatase titanium dioxide having a high surface area comprises forming an aqueous dispersion of particulate anatase titanium dioxide at a pH of not more than 3, adding to the dispersion a hydrolysable water soluble salt of a rutile inhibitor, increasing the pH of the dispersion to precipitate a first coating on the surface of titanium dioxide particles comprising the rutile inhibitor in the form of a hydrous oxide on the surface of titanium dioxide particles and subsequently adding a water soluble phosphate to form a second coating on the titanium dioxide particles comprising a phosphate.

Also according to the invention titanium dioxide suitable for use as a catalyst support comprises particles of anatase titanium dioxide having a first coating comprising a hydrous oxide of a rutile inhibitor and a second coating of a phosphate the coated particles having a specific surface area as determined by BET nitrogen desorption measurements of at least 50 meters squared per gram, at least 80% of said specific surface area being retained after heating the coated particles at 800° C. for 7 days.

The process of the invention comprises the treatment of an aqueous dispersion of anatase titanium dioxide. This dispersion can be formed in any suitable manner but a convenient source is the hydrous titania sometimes called "pulp" which results from the so-called "sulphate" process for the manufacture of titanium dioxide pigment. In the "sulphate" process a titaniferous ore is digested with concentrated sulphuric acid and the digestion cake dissolved in water or dilute acid to produce a solution of titanyl sulphate. Usually this titanyl sulphate is treated by classification and reduction before hydrolysis to precipitate the hydrous titania. Soluble iron compounds remain in solution and these are normally removed by filtration and washing. Residual sulphate ions and other impurities are removed from the washed hydrous titania by adjusting the pH of a slurry of the hydrous titania to between about 5 and 9 and washing with water before the hydrous titania is used for the process of this invention. Preferably the sulphate ion level is reduced to below 3% by weight and more preferably below 2% by weight of the titanium dioxide Alternatively, a slurry of anatase can be prepared by hydrolysis of a titanium orthoester such as tetraisopropoxy titanium. A slurry produced by such hydrolysis is also normally washed with water at a pH of 5 to 9 to remove residual organic species.

A dispersion of the anatase titanium dioxide is formed at a pH of not more than 3 usually by stirring the titanium dioxide with water and adjusting the pH of the dispersion with an acid, preferably hydrochloric acid. The specific surface area of the anatase produced by this process is increased as a result of forming a dispersion at a low pH and it is preferred to form the dispersion below a pH of about 2. Most preferably the dispersion is formed at a pH below 1. It is believed that the particles of titanium dioxide are at least partially "peptised" in this highly acidic dispersion. The process of "peptisation" causes the structure of agglomerates to be broken down and the surface area to be thereby increased.

Since the presence of impurities can be deleterious to the performance of the catalysts for which the product of this invention is intended the dispersion is usually formed without the use of a dispersing agent.

The concentration of the titanium dioxide in the dispersion is not critical but a convenient concentration to use is between 50 and 500 grams per liter, preferably between 100 and 300 grams per liter.

Normally the dispersion is stirred at a pH not greater than 3 for a period of from 1 to 15 minutes in order to optimise the development of a high surface area.

A hydrolysable water soluble salt of a rutile inhibitor is added to the dispersion. In this description the term "rutile inhibitor" is used to described an element which acts to stabilise the titanium dioxide in the anatase form at high temperatures. Elements which are suitable rutile inhibitors include aluminum, zirconium, silicon and lanthanum. The water soluble salts used are salts which hydrolyse to produce oxides or hydrated oxides of the elements when the pH of the dispersion is increased or when the dispersion is heated. Suitable salts will depend upon the element but typically chlorides, nitrates, sulphates and acetates are used and, for the precipitation of silica, alkali metal silicates are suitable. If desired, salts of more than one rutile inhibitor may be added.

The quantity of rutile inhibitor added will depend to some extent on the specific surface area of the anatase titanium dioxide before the rutile inhibitor is deposited as a coating. When the specific surface area is about 200 $m^2/g$ the amount of hydrolysable salt added can be sufficient to precipitate up to 20% by weight with respect to the titanium dioxide of the rutile inhibitor calculated as oxide. The preferred quantities are sufficient to produce an oxide layer representing less than 10% by weight and more preferably a quantity giving less than 5% by weight of oxide is used.

After addition of the hydrolysable salt the pH of the dispersion is adjusted to precipitate the rutile inhibitor as a hydrous oxide on the surface of the titanium dioxide particles. Frequently, the addition of the hydrolysable salt results in an increase in the pH of the dispersion but normally adjustment by the addition of a base is required to ensure complete precipitation. Any suitable base can be employed but preferably aqueous ammonia is used since this avoids contamination by any metal ions.

The pH value at which hydrolysis occurs will depend to some extent on the rutile inhibitor employed. For example, addition of a strongly acidic hydrolysable salt such as zirconium sulphate to a dispersion of anatase titanium dioxide at a pH value of approximately 3 will normally reduce the pH of the dispersion. Subsequent addition of base generally causes hydrolysis of the zirconium sulphate and, therefore, formation of a coating of zirconia on the anatase when the pH of the dispersion is adjusted back to a value about 3. However, to ensure complete precipitation and to ease handling, the pH of the dispersion is normally adjusted to a value between 5 and 9 and preferably to between 6 and 8 before the coated anatase is separated from the dispersion medium. Adjustment to a pH value between 5 and 9 can be made either before or after the water soluble phosphate is added to the dispersion.

The hydrolysis is carried out at any suitable temperature, usually below 50° C. and conveniently room temperature is employed.

After precipitation of the rutile inhibitor a water soluble phosphate is added to the dispersion and this forms a second coating of phosphate on the hydrated titanium dioxide particles. It is believed that the water-soluble phosphate is initially chemically adsorbed onto the surface of the titanium oxide particles but may later be converted by heating, for example, to titanium phosphate or a phosphate of an element forming the first coating on the titanium dioxide. However, the invention is not restricted to this explanation. Any water soluble phosphate may be added but phosphates of elements known to promote the conversion of anatase to rutile are not usually used. Organic phosphates are suitable and preferably the phosphate is monoammonium phosphate.

Usually the phosphate forms a coating on the titanium dioxide spontaneously when it is added to the dispersion at a pH between 5 and 9. However the phosphate layer can be produced on the titanium dioxide particles by any suitable means.

The amount of phosphate used is usually sufficient to produce a coating calculated as $P_2O_5$ of less than 5% by weight with respect to titanium dioxide and preferably the amount used is sufficient to produce a coating of less than 2% calculated as $P_2O_5$.

Any convenient temperature is employed and normally the phosphate coating is formed at room temperature.

After forming the phosphate coating the particulate titanium dioxide is usually separated by, for example, filtration, washed and dried by heating to about 500° C.

The product of the process of the invention is anatase titanium dioxide having a high specific surface area. The anatase also resists conversion to rutile and retains a large proportion of its surface area after prolonged heating at high temperatures.

Products of the process of the invention having a specific surface area as determined by BET nitrogen desorption measurements of at least 30 $m^2/g$ are useful as catalyst supports. Typically, the specific surface area of products of the process is greater than 50 $m^2/g$ and it has been found possible to form products having a specific surface area up to 200 $m^2/g$.

The stability of the anatase can be demonstrated by heating at 800° C. for a long period and determining the decrease in specific surface area as a result of the heating.

Anatase produced by the process according to the invention has been shown to retain at least 80% of its initial specific surface area when heated at 800° C. for 7 days.

The invention is illustrated by the following examples.

EXAMPLE 1

An aqueous slurry of anatase hydrous titania at a concentration of 300 grams per liter $TiO_2$ was neutralised to pH 6.2 with 0.88 g/ml ammonium hydroxide solution. The neutralised slurry was filtered and washed with hot demineralised water to reduce the adsorbed sulphate level to 2% (w/w on $TiO_2$). The washed hydrous titania was reslurried with demineralised water to 300 grams per liter $TiO_2$ and 20% hydrochloric acid was added while the slurry was stirred to reduce the pH to 3.

Silica (2% $SiO_2$ by weight on $TiO_2$) was added as sodium silicate solution with stirring to the acidified hydrous titania and stirring was continued for 20 minutes after which the pH had increased to 4. Alumina was added to this slurry as aluminum sulphate solution (2% $Al_2O_3$ by weight on $TiO_2$) and stirring was continued for 20 minutes. To effect complete precipitation the pH was increased with ammonium hydroxide solution to pH 7. Monoammonium phosphate was added and stirred in the slurry for approximately 30 minutes to ensure maximum adsorption of phosphate onto the hydrous titania. 2% $P_2O_5$ was added by weight on $TiO_2$.

The coated titania was filtered and washed with demineralised water and calcined at 800° C. for 3 hours to yield a product with a BET specific surface area of 65.6 $m^2/g$ and a rutile content <0.5%. Heating of the same titania for a further 168 hours resulted in a reduction in surface area to 56.5 $m^2/g$. The rutile content was unchanged.

EXAMPLE 2

An aqueous slurry of anatase was prepared at a pH of 3 by neutralising an initial slurry with ammonia, filtering, washing, reslurrying and adjusting the pH with hydrochloric acid as in Example 1. To the slurry, a solution of acid zirconium sulphate was added with stirring (equivalent to 3% by weight $ZrO_2$ on $TiO_2$), thus reducing the pH to a value of 1.7. To effect precipitation, the pH was increased to a value of 3 with aqueous ammonia, and a solution of monoammonium phosphate was then added to the stirred slurry (equivalent to 2% $P_2O_5$ by weight on $TiO_2$).

The pH of the dispersion was adjusted to a value of 7 and the coated titanium was filtered and washed with demineralised water and calcined at 800° C. for 16 hours to yield a product with a BET specific surface area of 42.3 $m^2/g$ and a rutile content of <0.1%.

I claim:

1. A process for preparing anatase titanium dioxide having a high surface area comprising the steps of:
   a) preparing hydrous titania in the anatase form by hydrolysis of a titanium compound selected from the group consisting of titanyl sulphate and titanium orthoesters,
   b) forming an aqueous dispersion of said hydrous titania in the anatase form at a Ph of not more than 3,
   c) adding to the dispersion a hydrolyzable water soluble salt of a rutile inhibitor,
   d) increasing the Ph of the dispersion to precipitate a first coating on the surface of said hydrous titania particles comprising the rutile inhibitor in the form of a hydrous oxide; and e) adding a water soluble phosphate to form a second coating on the said hydrous titania particles comprising a phosphate.

2. A process according to claim 1 in which the anatase hydrous titania contains less than 3 per cent by weight sulphate ion.

3. A process according to claim 1 in which the anatase hydrous titania contains less than 2 per cent by weight sulphate ion.

4. A process according to claim 1 in which the aqueous dispersion of particulate anatase hydrous titania has a pH value less than 2 before the first coating is precipitated on to the surface of the hydrous titania particles.

5. A process according to claim 4 in which the pH value of the aqueous dispersion is less than 1 before the first coating is precipitated on to the surface of the hydrous titania particles.

6. A process according to claim 1 in which the aqueous dispersion is stirred at a pH of not more than 3 for from 1 to 15 minutes before the first coating is precipitated on to the surface of the hydrous titania particles.

7. A process according to claim 1 in which the rutile inhibitor is selected from the group consisting of aluminium, zirconium, silicon and lanthanum.

8. A process according to claim 1 in which the water soluble salt of the rutile inhibitor is selected from the group consisting of chlorides, nitrates, sulphates and acetates of rutile inhibitors and alkali metal silicates.

9. A process according to claim 1 in which the water soluble salt of the rutile inhibitor is added in an amount which is sufficient to precipitate up to 20 per cent by weight of rutile inhibitor calculated as oxide on to the surface of the particles of hydrous titania.

10. A process according to claim 9 in which the amount of water soluble salt of the rutile inhibitor is sufficient to precipitate up to 10 per cent by weight of rutile inhibitor calculated as oxide.

11. A process according to claim 9 in which the amount of water soluble salt of the rutile inhibitor is sufficient to precipitate up to 5 per cent by weight of the rutile inhibitor calculated as oxide.

12. A process according to claim 1 in which the water soluble phosphate is selected from the group consisting of organic phosphates and monoammonium phosphate.

13. A process according to claim 1 in which the water soluble phosphate is added to the aqueous dispersion of particulate anatase hydrous titania when the dispersion has a pH value between 5 and 9.

14. A process according to claim 1 in which the water soluble phosphate is added to the dispersion of particulate anatase hydrous titania in an amount sufficient to produce a coating on the surface of the hydrous titania particles of less than 5 per cent by weight calculated as $P_2O_5$ with respect to hydrous titania.

15. A process according to claim 14 in which the amount of water soluble phosphate is sufficient to produce a coating on the surface of the hydrous titania particles of less than 2 per cent by weight calculated as $P_2O_5$ with respect to hydrous titania.

16. A process according to claim 1 in which the aqueous dispersion of particulate anatase hydrous titania contains from 50 to 500 grams of titanium dioxide per liter.

17. A process according to claim 16 in which the aqueous dispersion contains from 100 to 300 grams hydrous titania per liter.

18. A process according to claim 1 in which the aqueous dispersion of particulate anatase hydrous titania is adjusted to a pH value between 5 and 9 before the coated anatase hydrous titania particles are separated from the dispersion medium.

19. A process according to claim 18 in which the pH of the aqueous dispersion is adjusted to a value between 6 and 8 before the coated anatase hydrous titania particles are separated from the dispersion medium.

20. A process according to claim 1 in which the first coating is formed at a temperature below 50° C.

21. A process according to claim 1 in which the coated anatase hydrous titania particles are separated from the dispersion medium and dried at a temperature of about 500° C.

22. Particulate anatase titanium dioxide having a specific surface area of at least 30 meters squared per gram as determined by BET nitrogen desorption measurement prepared according to the process of claim 1.

23. Particulate anatase titanium dioxide the particles of which have a first coating comprising a hydrous oxide of a rutile inhibitor and a second coating of a phosphate, the coated particles having a specific surface area as determined by BET nitrogen desorption measurement of at least 50 meters squared per gram, at least 80 per cent of said specific surface area being retained after heating the coated particles at 800° C. for 7 days.

24. Particulate anatase titanium dioxide according to claim 23 in which the specific surface area of the coated particles of anatase titanium dioxide is up to 200 meters squared per gram.

* * * * *